United States Patent
Bishop et al.

(10) Patent No.: US 11,568,506 B2
(45) Date of Patent: Jan. 31, 2023

(54) SYSTEM OF AND METHOD FOR FACILITATING ON-DEVICE TRAINING AND CREATING, UPDATING, AND DISSEMINATING MICRO-LEARNING SIMULATIONS

(71) Applicant: SKYLLFUL LLC, Denver, CO (US)

(72) Inventors: Benjamin Bishop, McKinney, TX (US); Justin Lake, McKinney, TX (US); Eugene Signorini, Canton, MA (US)

(73) Assignee: SKYLLFUL INC., Denver, CO (US)

( * ) Notice: Subject to any disclaimer, the term of this patent is extended or adjusted under 35 U.S.C. 154(b) by 0 days.

(21) Appl. No.: 17/376,015

(22) Filed: Jul. 14, 2021

(65) Prior Publication Data
US 2022/0020104 A1     Jan. 20, 2022

Related U.S. Application Data

(60) Provisional application No. 63/051,794, filed on Jul. 14, 2020.

(51) Int. Cl.
| | | |
|---|---|---|
| *G09B 19/00* | (2006.01) | |
| *G06F 40/169* | (2020.01) | |
| *G09B 9/00* | (2006.01) | |
| *G06Q 50/20* | (2012.01) | |
| *G06Q 10/06* | (2012.01) | |
| *G06F 3/0484* | (2022.01) | |

(Continued)

(52) U.S. Cl.
CPC ....... *G06Q 50/2057* (2013.01); *G06F 3/0484* (2013.01); *G06F 9/453* (2018.02); *G06F 40/169* (2020.01); *G06Q 10/067* (2013.01); *G06Q 10/0637* (2013.01); *G09B 9/00* (2013.01); *H04L 65/4025* (2022.05)

(58) Field of Classification Search
CPC .. G06Q 50/2057; G06Q 10/067; G06F 9/453; G06F 40/169; G06F 3/0484; H04L 63/4023
USPC .......................................... 434/118; 715/200
See application file for complete search history.

(56) References Cited

U.S. PATENT DOCUMENTS

| | | |
|---|---|---|
| 3,830,951 A | 8/1974 | Rumstein |
| 5,344,326 A | 9/1994 | Ferris |
| 6,308,042 B1 | 10/2001 | Marsh et al. |

(Continued)

OTHER PUBLICATIONS

Tara Bryan, Interactive Screenshot E-Learning Challenge, Apr. 28, 2014, tlslearning.com, p. 1 (pdf).*

*Primary Examiner* — Manglesh M Patel
(74) *Attorney, Agent, or Firm* — Kutak Rock LLP; Brian L. Main

(57) ABSTRACT

A system of and method for facilitating on-device training and creating, updating, and disseminating micro-leaning simulations is provided. The system utilizes a trio of core tools, which are Simulator tool, a Creation tool, and a management and monitoring tool. These tools are utilized to develop tracks, modules, and lessons for users to complete and demonstrate proficiency. The system provides for recreation of native mobile applications from screenshots and utilizing these recreations for the development of sandboxed lessons without need to access the native application during training. The system also includes utilizing mobile device features and peripherals to create a realistic training simulation.

11 Claims, 13 Drawing Sheets

(51) Int. Cl.
*G06F 9/451* (2018.01)
*H04L 65/402* (2022.01)

(56) References Cited

U.S. PATENT DOCUMENTS

| | | |
|---|---|---|
| 6,600,480 B2 | 7/2003 | Natoli |
| 7,629,527 B2 | 12/2009 | Hiner et al. |
| 7,882,486 B2 * | 2/2011 | Fernandez ............... G06F 8/38 |
| | | 717/109 |
| 8,087,007 B2 | 12/2011 | Duneau |
| 8,636,514 B1 | 1/2014 | Luebbe |
| 9,262,321 B2 | 2/2016 | Benhase et al. |
| 9,285,948 B2 | 3/2016 | Duneau |
| 9,570,050 B2 | 2/2017 | Duneau |
| 9,811,352 B1 * | 11/2017 | Sharifi ................. G06F 40/134 |
| 9,940,845 B2 | 4/2018 | Knoche et al. |
| 10,311,742 B2 | 6/2019 | Falash et al. |
| 10,559,217 B2 | 2/2020 | Alvarez et al. |
| 10,580,323 B2 | 3/2020 | Canioni et al. |
| 2007/0300179 A1 * | 12/2007 | Friedlander ............ G06Q 10/06 |
| | | 715/781 |
| 2009/0226870 A1 | 9/2009 | Minotti |
| 2009/0249189 A1 * | 10/2009 | Jania ..................... G06F 40/143 |
| | | 715/234 |
| 2012/0269394 A1 * | 10/2012 | Kern ................... G06F 16/5854 |
| | | 382/103 |
| 2013/0318083 A1 * | 11/2013 | Han ....................... G06Q 10/10 |
| | | 707/736 |
| 2014/0189576 A1 * | 7/2014 | Carmi .................. G06V 10/752 |
| | | 715/781 |
| 2015/0128017 A1 * | 5/2015 | Fithian ................. G06F 40/134 |
| | | 715/205 |
| 2015/0339942 A1 | 11/2015 | Ben-Naim |
| 2018/0068575 A1 | 3/2018 | Nishizawa et al. |
| 2018/0075770 A1 | 3/2018 | Falash et al. |
| 2019/0066533 A1 | 2/2019 | Ufimtceva |

* cited by examiner

SYSTEM OF AND METHOD FOR FACILITATING ON-DEVICE TRAINING AND CREATING, UPDATING, AND DISSEMINATING MICRO-LEARNING SIMULATIONS

CROSS-REFERENCE TO RELATED APPLICATIONS

This application claims priority pursuant to 35 U.S.C. 119(e) to U.S. Provisional Patent Application Ser. No. 63/051,794, filed Jul. 14, 2020, the entire disclosure of which is incorporated herein by reference.

FIELD OF THE INVENTION

The present invention relates generally to creating, updating, and providing training sessions. More specifically, the present invention is concerned with on-device training for mobile applications via micro-learning simulations that simulate the use of native application interactions and native device sensors and peripherals.

BACKGROUND

The delivery of learning materials via digital means is becoming increasingly common, such as by way of a learning management systems ("LMS"). Unfortunately, LMS's and other existing systems (each an "LMS") tend to be structured for training students and managing educational materials, such as by managing content for online courses that are traditionally organized like an educational institution. For instance, training is often organized by courses, classes, semesters, and the like, which can be can unhelpful or even counterproductive when training a workforce or otherwise providing training in a corporate environment. Accordingly, it would be beneficial to have training systems and methods that are developed with a corporate structure in mind rather than an educational structure. It would be further beneficial if the systems and methods were structured to manage work-related materials, such as training sessions that are project-specific and/or role-specific.

LMS's originally gained traction in desktop browser environments. Over the course of the past 10 years the creators of these systems have slowly adapted the delivery of the content for mobile devices, but such adaptations have been largely limited to converting traditional training materials for delivery through a mobile device (format conversion), such as by converting documents to be mobile-friendly, thereby increasing the mobility of the training documents. But mobile devices provide more benefits than just mobility. For instance, numerous applications have been created, and continue to be created, to allow users to maximize the ever-increasing computing power contained within their mobile devices. Furthermore, the quantity and quality of sensors and available peripherals continues to increase, thereby further increasing versatility of mobile devices. Accordingly, it would be beneficial for training systems and methods to take advantage of the present and ever-increasing versatility provided by mobile devices.

As versatility of mobile applications continues to increase, the use of such applications in the corporate environment also increases, thereby increasing the need for effective training. Because applications are continuously updated, there is also a need for the associated training to be updatable. Until the creation of the present invention, the most effective training for mobile applications could be categorized under two sub-headings—Screen Representation and Screen Duplication.

Screen Representation utilizes a series of screenshots of application screens. These screenshots are often inserted into documents (i.e. Word, PowerPoint, or PDF) as static images, usually accompanied by text instructions. Unfortunately, static images, whether accompanied by text instructions or not, are limited in their ability to adequately represent the versatility of a mobile application. In an effort to improve training effectiveness, some training sessions utilize interfacing elements, such as invisible "tappable" areas positioned over a screenshot image, to create the perception that the image is interactive. Upon "tapping" or otherwise engaging an interface element, the training window navigates to a different webpage that displays a different screenshot. While such interactivity can give the illusion of an active application, the training merely navigates between series of static screenshots. Furthermore, each screenshot must be individually procured, regardless of how similar the screenshots are, and individually replaced upon the application being updated, in order to maintain the perception of interactivity and/or the illusion of the training session providing an accurate representation of the application. Such efforts can be time consuming and tedious with minimal benefit, not to mention the storage space and organization required for storing such screenshots. Accordingly, it would be beneficial to have training systems and methods that provide more than just the perception of interactivity and/or a mere illusion of providing an accurate representation of an application. Furthermore, it would be beneficial to have training systems and methods that do not require individual procurement of a plurality of screenshots, especially when many such screenshots are similar to each other and/or are updated frequently.

Screen Duplication utilizes native tooling (libraries and tools such as those Apple and Google provides to developers—i.e. XCode for iOS and Android Studio for Android) to create a training session, sometimes requiring updates to source code in order to add interactive training elements on top of a production application. Because such training sessions are created using the same native tooling used to create the associated application, Screen Duplication can be at least somewhat efficient when training sessions are created and managed by the same people creating and managing the application. But training is often tailored for a specific corporate need, often making it difficult or impossible for creators of an application to create and manage all training associated with such application. Furthermore, even when application creators do create training for their applications, it may be difficult or impossible to get such application creators to timely update specific corporate training to accommodate a change associated with the corporation's unique use of the application, to correct an error in the training, or the like, especially if the application is no longer a priority for the creators, such as if the application creators are no longer supporting a particular version used by the corporation, if the application creators have prioritized other applications, or the like.

Third-party training creators tend to provide better training products because they have a better understanding of how a corporation is using the application and because they are better positioned to update the training to accommodate any changes to such use, regardless of whether the change is driven by the application or the corporation. Unfortunately, third-party training creators often have limited or no access to (and/or limited or no familiarity with) native mobile application source-code, making Screen Duplication difficult or impossible for third-party training creators. Furthermore still, potential update requirements to the training and/or to the application itself provides additional difficulties for third-party training providers who must determine whether they have a correct version of source code and/or how best to update such source code, often requiring extensive trial and error, each trial potentially consisting of extensive time and resources reviewing and updating source code prior to compiling and testing the same. Accordingly, it would be beneficial to have a system for and a method of providing training sessions that does not require access to or use of source code of the application.

Unfortunately, there are several issues associated with existing training options. For instance, many training systems and methods take critical mobile workers (such as delivery reps, maintenance repair technicians, drivers and others) out of the field for training, which increases costs associated with downtime and lost productivity. Accordingly, it would be advantageous to have a mobile solution that minimizes such downtime.

Additionally, present solutions facilitate the need to deploy physical trainers to disparate locations to conduct on-site training, which can include costs associated with hiring additional training staff, travel expenses, site rentals to conduct training, and training content for instructor-led training. Consequently, it would be advantageous to have a training system that facilitates on-site training without the costs associated with traditional on-site training.

Not all workers learn at the same rate, and the level of training required varies from worker to worker due, at least in part, to each worker's unique background and differing work requirements. Accordingly, it would be advantageous to have a training system that enables users to obtain the training they need without requiring them to sit through training that they do not need.

Workers are not automatons who can retain everything they learn, especially when application of the training is far removed temporally and/or physically from the time and/or place where the training occurred. Accordingly, it would be advantageous to have an on-demand training system that enables users to obtain the training they need when they need it and/or where they need it.

Additionally, for present solutions that require traditional instructor-led training, any changes to the application would require additional on-site or remote sessions to educate users, which may take weeks or even months to schedule. Accordingly, it would be advantageous to have a training system that enables instantaneous delivery of new and/or updated training simulations directly to each user requiring such new or updated training, thereby facilitating training at the user's convenience.

Additionally, present solutions designed to deliver instruction via PowerPoint slides, PDFs, Word Documents, video, or other traditional medium are not necessarily optimized for consumption on mobile devices. Furthermore, such content cannot simulate real-world usage of an actual application for which the training is required. Furthermore still, such training is not tailored for the mobile device, thereby limiting the effectiveness of the training and potentially causing the training to be counterproductive (instructions for performing a task with one device may not work for performing the same task on another device). Accordingly, it would be advantageous to have a training system that can simulate usage of a specific application with a specific mobile device while utilizing content optimized for consumption on such mobile device.

Additionally, mobile workers often conduct their work in areas of poor mobile connectivity. Accordingly, it would be advantageous to have a training system with offline training capabilities.

Additionally, orientation training for new employees can be overwhelming, and many companies do not (or cannot) dedicate the same resources or time to training for new employees hired into the organization. Accordingly, it would be advantageous to have a training system that allows newly hired mobile workers to receive on-demand on-device training without the need to sit through extensive instructor-led training.

Additionally, traditional classroom training has been shown to be ineffective for long-term retention of important information. Accordingly, it would be advantageous to have a training system that facilitates micro-learning and on-demand learning, thereby allowing users to learn in smaller increments and repeat lessons or instruction as needed for better long-term retention.

Additionally, it takes a considerable amount of time and effort to develop, update, and disseminate training using traditional methods, thereby making it less likely for managers to approve the creation of (or update to) such training and making it less likely for workers to actually need the training because, in many cases, workers have already figured out how to perform a task before training is provided (or updated), sometimes developing bad habits along the way that may be difficult or impossible to break, regardless of the amount of training provided. Accordingly, it would be advantageous to have a training system for dynamic and lightweight content creation which is adaptable to emerging scenarios, thereby facilitating quick and effective creation, updating, and dissemination of training.

SUMMARY

The present invention comprises training systems and methods that are structured for providing optimized training for a corporate structure, such as by providing training that is project specific and/or role-specific. In some embodiments, the present invention assigns a Training Program to a plurality of users (each user assigned a Training Program being a "Trainee"). In some embodiments, each Training Program comprises one or more Training Track, each Training Track comprises one or more Training Module, each Training Module comprises one or more Training Lesson, each Training Lesson comprises one or more Training Exercise, and each Training Exercise comprises one or more Training Step. It will be understood that the Training Program structure indicated above is for exemplary purposes only and that other structures are also contemplated to accommodate a specific corporate need. Each Training Program is specifically designed for a specific functional role, for a specific corporate initiative, or the like. In some circumstances a Trainee is assigned a plurality of Training Programs, such as when a manager is required to understand more than one job role. In some circumstances a Trainee is assigned a first Training Program and then a second Training Program, such as in association with a promotion, a demotion, changes to corporate policies, start of a corporate initiative, completion of a corporate initiative, or the like. By structuring training to be optimized for a corporate structure, effectiveness of, and compliance with, such training is also optimized.

The present invention improves training experiences by facilitating maximum utilization of training devices, such as by enabling users to take advantage of the ever-increasing versatility provided by mobile devices. For instance, some Training Lessons of the present invention are Simulation Lessons for training Trainees on how to perform a specific task using a mobile device. During such Simulation Lessons, the Trainee utilizes one or more sensor, peripheral, or the like (each a "Device Feature") in a way that is indistinguishable, from the Trainee's perspective, from how the Device Feature is utilized when performing the actual task. In this way, the versatility of the mobile device that enables performance of the task is being utilized during the Training Lesson associated with the task, thereby improving the training experience.

Some embodiments of the present invention involve Screen Replication, which is distinguishable from the Screen Representation and Screen Duplication at least because Screen Replication does not require access to native application source code in the creation of simulation content nor does Screen Replication utilize screenshots in final simulations delivered on mobile devices.

Screen Replication involves creation of one or more screen replicas, each screen replica being associated with one or more actual screens of an application. In some embodiments, a screen replica includes one or more embedded features, such as an interfacing feature, which is configured to replicate the functionality of a counterpart feature of an application. In this way, a Trainee can interface directly with a screen of a training session in a manner that is virtually indistinguishable from how the Trainee interfaces with a counterpart feature of an application. In some embodiments, the training session is configured to provide feedback indicating whether the Trainee properly interfaced with the training session, such as an indication of whether the Trainee selected a correct feature at a correct time given a certain set of circumstances. In some embodiments, the indication is provided immediately following the interaction for which feedback is being provided. In some embodiments, the indication is provided at the end of a training session and/or at some other point other than immediately following the Trainee's interaction for which feedback is being provided. In some embodiments, the screen replica facilitates a variety of user interactions, such as inputting text, scanning bar codes, swiping, and other interactions that directly replicate 'real world' usage scenarios.

Screen Replication involves utilization of a replica tool to create and update screen replicas. In some embodiments, the replica tool facilitates creation of a variety of screen replicas, many of which utilize editable variables, common plugins, and the like, thereby facilitating efficient creation and management of a plurality of screen replicas. In this way, creation of training sessions can be streamlined, and efforts associated with updating training sessions can be minimized, thereby reducing costs and lead time associated with the same. For instance, in some embodiments a plurality of screen replicas are produced from a single template replica having one or more editable variables, such as an editable or otherwise variable text string, graphic, or the like, thereby reducing the amount of raw data required to be created and updated when creating and managing a training session, such as a training simulation.

The replica tool is configured to allow users to annotate executable and/or variable elements of a screen replica, such as elements representing buttons, text areas, or the like. In this way, the replica tool facilitates creation of editable training sessions, thereby facilitating updates to a screen replica without requiring recreation of the screen replica. In some embodiments, creation (or recreation as the case may be) comprises utilization of one or more APIs, SDKs, plugins, or other means of obtaining, cataloging, converting, and utilizing one or more elements, components, or the like. In some embodiments, format information, such as CSS styles and the like, are embedded in a resultant file, thereby eliminating rendering dependencies of external files.

Screen Replication further involves utilization of a delivery tool through which one or more training sessions is accessible. In some embodiments, the delivery tool comprises two layers, an Application Layer and an Embedded Layer.

The Application Layer is configured to interact directly with one or more device features, such as sensors or the like, and/or one or more peripherals, such as scanners, printers, and other peripherals in much the same way, if not in exactly the same way, the application interacts with the same features and/or peripherals. In this way, the Application Layer causes the mobile device to function during a training lesson in much the same way the mobile device functions during actual use of the application. In some embodiments, the Application Layer utilizes native SDKs, APIs, UI libraries, third-party vendor libraries, and the like.

The Embedded Layer is embedded within the Application Layer and is configured to display the plurality of screen replicas. In this way, the Embedded Layer causes the mobile device to display during a training lesson similar, if not exactly the same, images as it displays during actual use of the application. Upon a Trainee interacting with the Embedded Layer, information associated with such interaction is processed and appropriate action is taken. For instance, upon a Trainee interfacing with a print, scan, image capture, or other feature of the Embedded Layer, a communication is sent to the Embedded Layer to perform such action. Upon completion (or failure) of such action, the Application Layer communicates with the Embedded Layer so as to facilitate appropriate updating of the same. By interfacing the Embedded Layer with the Application Layer, the present invention provides a realistic simulation of the application rather than just a mere representation of an application.

The present invention further improves the training experience by addressing several issues with existing training options. Some embodiments of the present invention provide a versatile mobile solution that is optimized for the mobile workforce, thereby reducing or eliminating downtime associated with traditional training methods. Some embodiments of the present invention facilitate on-site training while reducing costs associated with traditional on-site training. Some embodiments of the present invention facilitate on-demand training, thereby enabling users to obtain the training they need when they need it and/or where they need it. Some embodiments of the present invention facilitate instantaneous delivery of new and/or updated training simulations directly to each user requiring such new or updated training, thereby facilitating training at the user's convenience. Some embodiments of the present invention simulate usage of a specific application with a specific mobile device while utilizing content optimized for consumption on such mobile device. Some embodiments of the present invention facilitate offline training, thereby providing training options while working in areas of poor mobile connectivity. Some embodiments of the present invention facilitate on-boarding of newly hired mobile workers, such as by providing on-demand on-device training without the need to sit through extensive instructor-led training. Some embodiments of the present invention facilitate micro-learning and on-demand learning, thereby allowing users to learn in smaller increments and repeat lessons or instruction as needed for better long-term retention.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

Figure 1A:
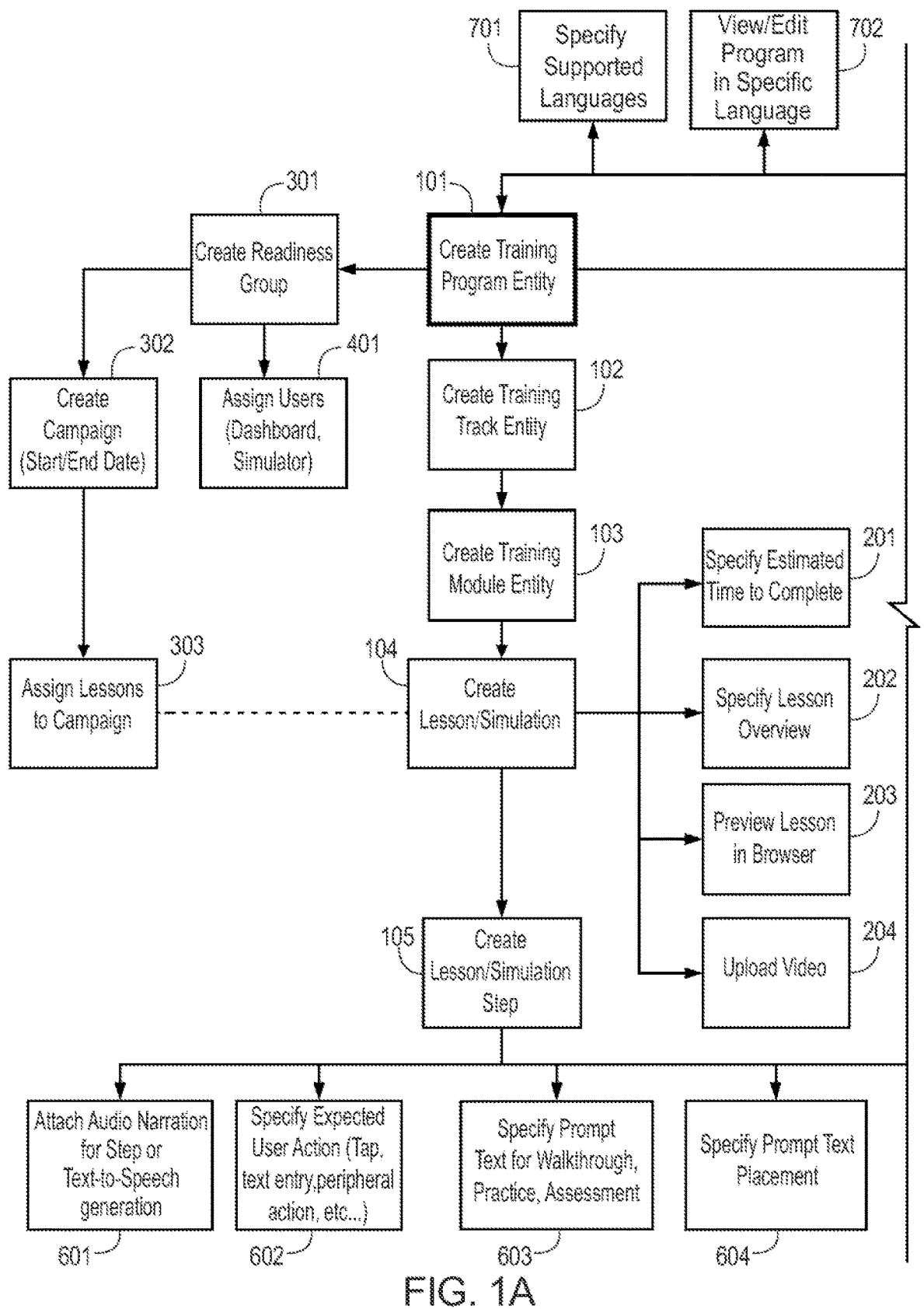
FIGS. 1A and 1B, together, show a flow diagram for lesson creation, according to one embodiment of the present invention.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In some embodiments, the system can simulate an application without using or otherwise accessing the application. In some embodiments, the present invention includes capabilities that allow users to: create micro-learning simulations of any mobile application; deploy simulations on mobile worker devices for on-demand training even while offline; and track learner progress and effectiveness of training programs via analytics and dashboards.

Various embodiments of the present invention are more cost-effective for companies to deploy over traditional instructor-led training, and more effective than classroom training or other static digital training content. In some embodiments, the present invention facilitates creation and dissemination of realistic simulations without requiring access to or integration with real systems or databases.

The system and method, in some embodiments, include tools directed towards one or more core elements of training employees, where the employees may be frontline employees. In some embodiments, the system and method incorporate using mobile technology. In some embodiments, the core elements of training employees are accomplished through one or more core element tools. In some embodiments, the core element tools include at least a simulator tool, a creation tool, and/or a management and monitoring tool. In some embodiments, such tools are implemented on one or more mobile devices, either natively or using integrated applications on such device.

In some embodiments, a simulator core element tool is provided. In some embodiments, the simulator core element tool provides guided training curriculum. In some embodiments, the guided training curriculum is arranged in a series of tracks, modules, and lessons. In some embodiments, the simulator core element tool runs in a browser of an application, while in others the tool is implemented on a mobile device. In some embodiments, the simulation tool has one or more modes. In some embodiments, the one or more mode is a video mode, a walkthrough mode, a practice mode, an assessment mode, or a walk and talk narrated walkthrough mode. In some embodiments, several modes are utilized.

In some embodiments, a video mode is utilized. In such embodiments, the video mode is a presentation of an application, where a video is inserted into the presentation to present an animated overview of a training lesson. In some embodiments, the presentation includes a task for a user to complete.

In some embodiments, a walkthrough mode is utilized. In such embodiments, the walkthrough mode is a presentation of an application. In some embodiments, the presentation includes a task for a user to complete. In some embodiments, the task is related to one or more business activity. In some embodiments, the walkthrough mode includes a step-by-step presentation of a path a user must take in the application to complete the business activity. In some embodiments, the application is a recreation of a counterpart application, in whole or in part.

In some embodiments, a practice mode is utilized. In some embodiments, the practice mode is a presentation of an application, where a task or objective is present for a user to complete. In some embodiments, after being presented with an objective, a user is prompted to attempt to complete the task without any guidance. When an incorrect action has been attempted, the simulation tool presents some coaching to help guide the user. The coaching is contemplated as being a written or audio prompt to the user to assist the user in identifying a correct path to complete the task. In some embodiments, the coaching includes visual aids to assist the user in identifying a correct path.

In some embodiments, an assessment mode is contemplated. In some embodiments, such assessment mode is utilized to gauge a trainee's mastery of a skill. In some embodiments, such assessment mode presents a user with an objective to accomplish with no coaching. In some embodiments, a user is given an allowance of a predetermined number of incorrect actions before the assessment session is restarted. In some embodiments, the assessment mode identifies users who require more training and users who have achieved an acceptable mastery of a skill. In some embodiments, such identification takes place without having to provide a user access to the actual program in which the skill is needed.

In some embodiments, a walk and talk narrated walkthrough mode is utilized. In such embodiments, the walk and talk narrated walkthrough mode is a presentation of an application. In some embodiments, the walk and talk narrated walkthrough mode is a narrated and/or animated walkthrough. In some embodiments, the presentation includes a task for a user to complete. In some embodiments, the task is related to one or more business activity. In some embodiments, animated walkthrough content is combined with audio files to create a mode that combines both visual and auditory learning techniques. In some embodiments, audio files are generated by creating a script and using text-to-speech to automatically generate a voice-over file for the animated walkthrough.

In some embodiments, a simulation tool broadcasts requests and captures events from device peripherals. In some embodiments, the device peripherals include cameras, microphones, or other data input devices. In some embodiments, these requests and events are integrated with simulation tool content. In some embodiments, these requests and events validate the user has taken the appropriate actions with these peripherals, such as by scanning a code with the peripheral. In some embodiments, the simulation tool provides a user with a simulated use of the peripheral tool as it would normally be associated with one or more application without the user having actual access to the application. In some embodiments, the simulation tool assesses a user based on the information provided by the peripheral.

In some embodiments, a creation core element tool is utilized. In some embodiments, a creation core element tool integrates with one or more applications present on an electronic device. In some embodiments, that integration is completed utilizing one or more plugin. In some embodiments, the integration is with one or more graphics application. In some embodiments, the integration is with one or more developer applications, such as a software development kit. In some embodiments, the integration is with one or more native application. In some embodiments, the integration is with one or more applications, such as a screen uploader application. In some embodiments, the integration is with one or more screen replica generators. In some embodiments, the creation tool facilitates the creation and management of training content that is delivered to the simulator core element tool. In some embodiments, the creation tool and/or plugin enables one or more user to recreate screenshots of applications into an optimized file format. In some embodiments, the optimized file format is HTML and SVG. In some embodiments, the optimized file format is relatively lightweight and editable via an interface of the present invention and one or more tools of the present invention. In some embodiments, the optimized file format results in a smaller file size than a standard screenshot. In some embodiments, the optimized file also includes editable fields.

In some embodiments, the creation tool enables lesson designers to make copies of screens. In some embodiments, such screen copies are optimized to include editable text to fit different training scenarios as well as different languages. In some embodiments, such optimization to include editable text facilitates the creation of a "sandbox". In some embodiments, the sandbox allows trainees to interface with an app without having to be connected to production data. In some embodiments, the creation tool enables lesson designers to script lessons in a screen-by-screen and step-by-step methodology.

In some embodiments, a management and/or monitoring core element tool is provided. In some embodiments, the management and/or monitoring core element tool enables users to manage workflow associated with training. In some embodiments, such users are business managers and program stakeholders. In some embodiments, managing workflow includes managing the release and/or monitoring training content. In some embodiments, the workflow can be managed and/or released and/or monitored in a series of campaigns.

Training Lessons

Figure 1B:
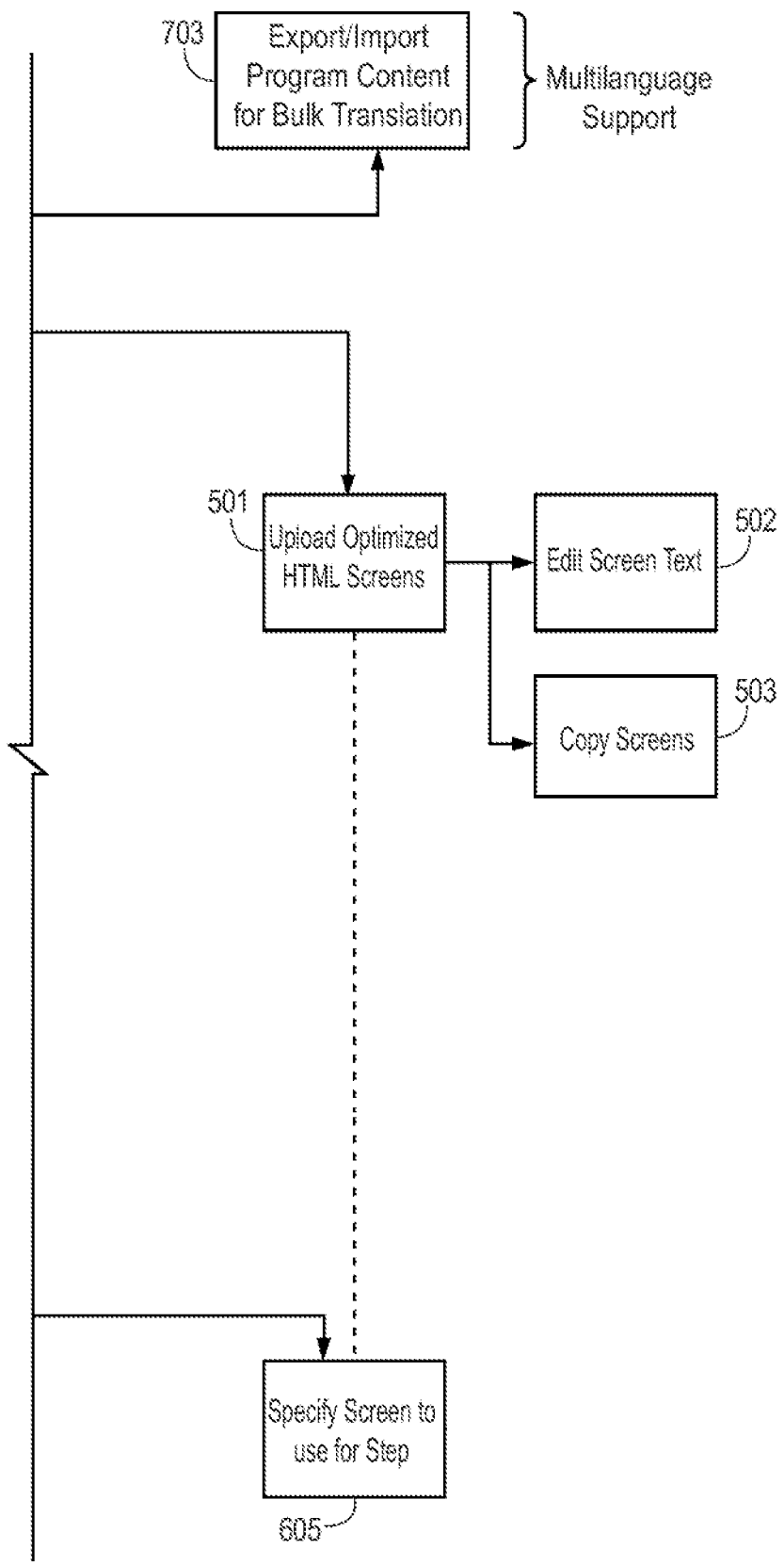
Figure 2A:
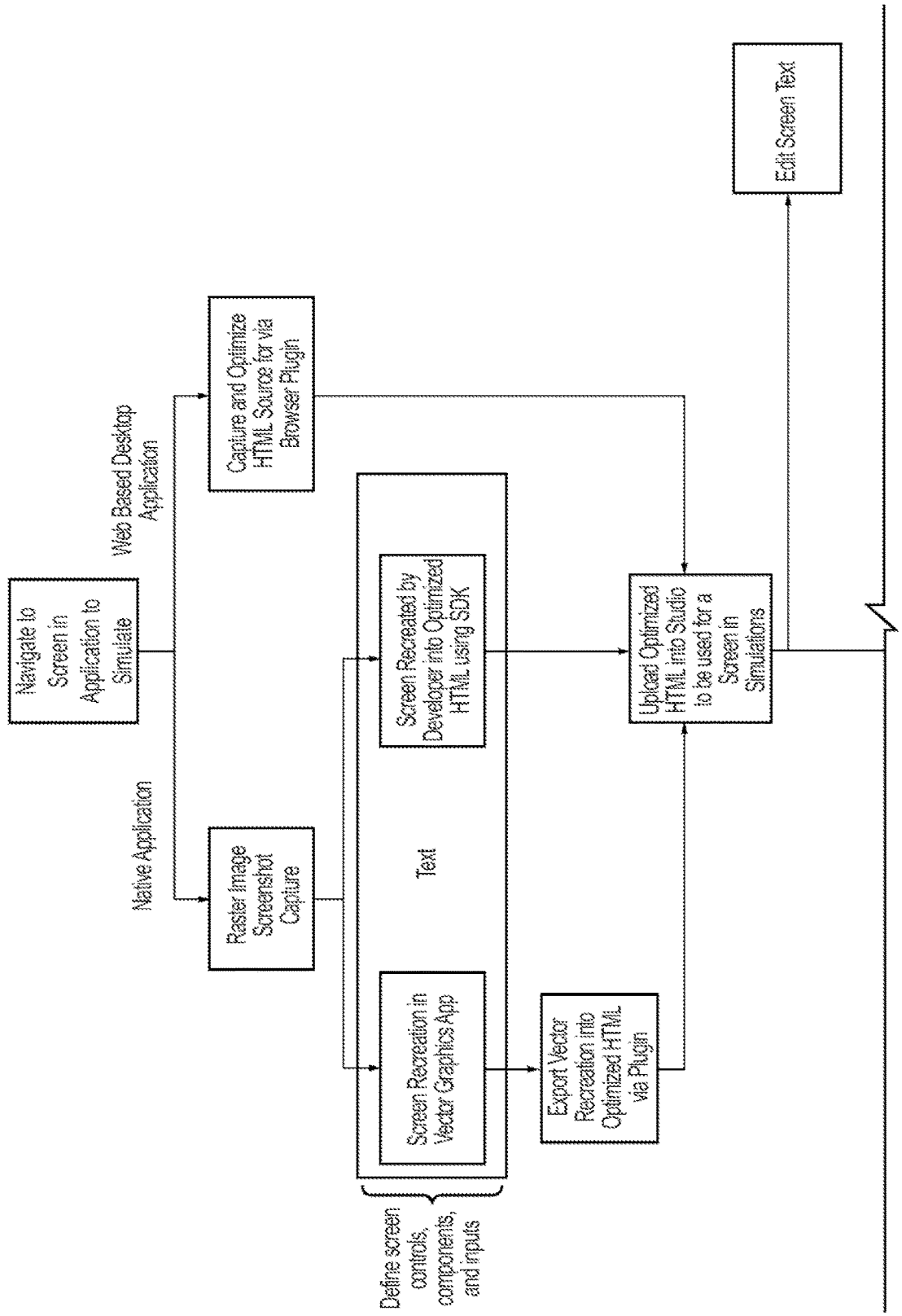
FIGS. 2A and 2B, together, show a flow diagram for lesson creation, according to one embodiment of the present invention.
Figure 2B:
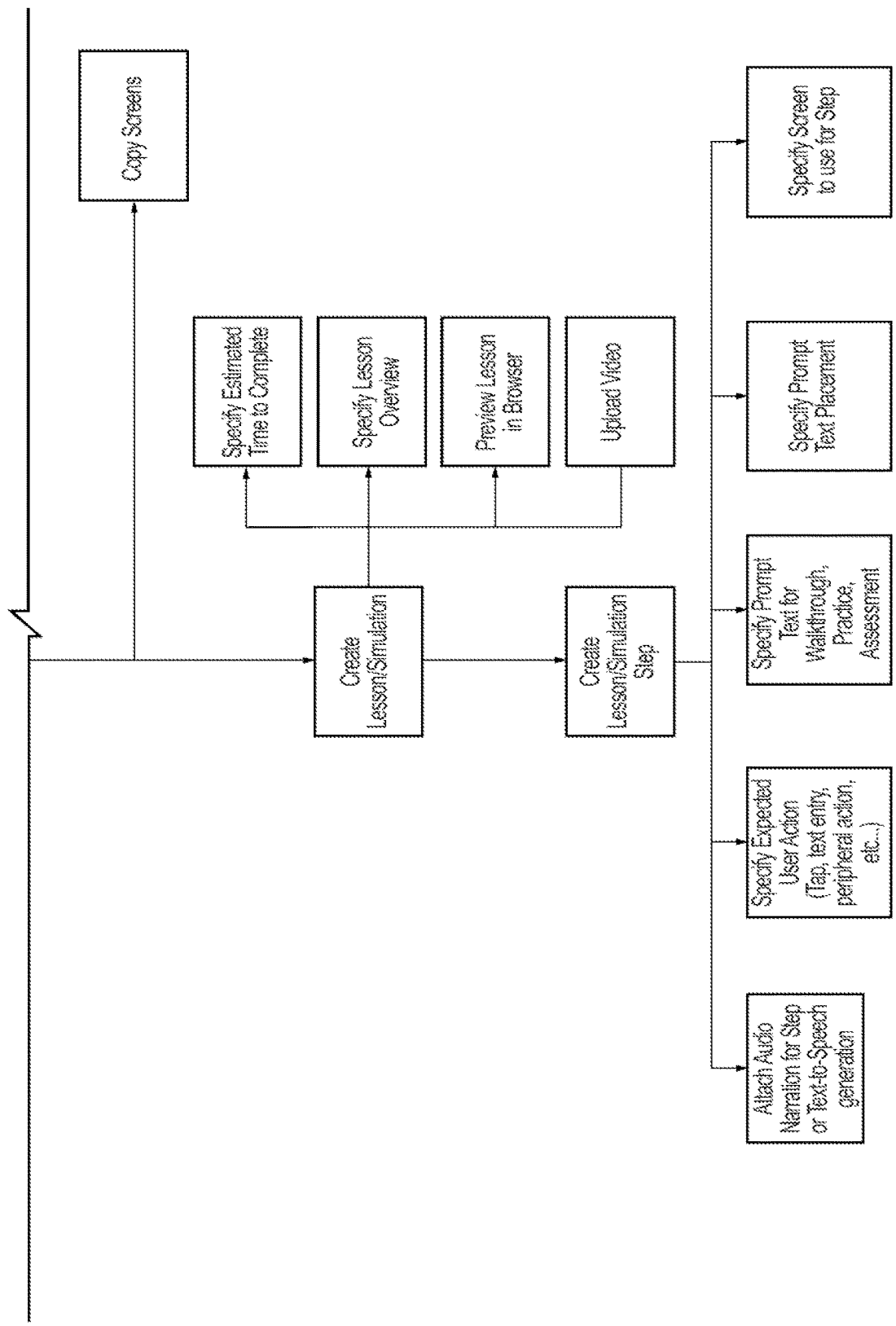
Figure 3:
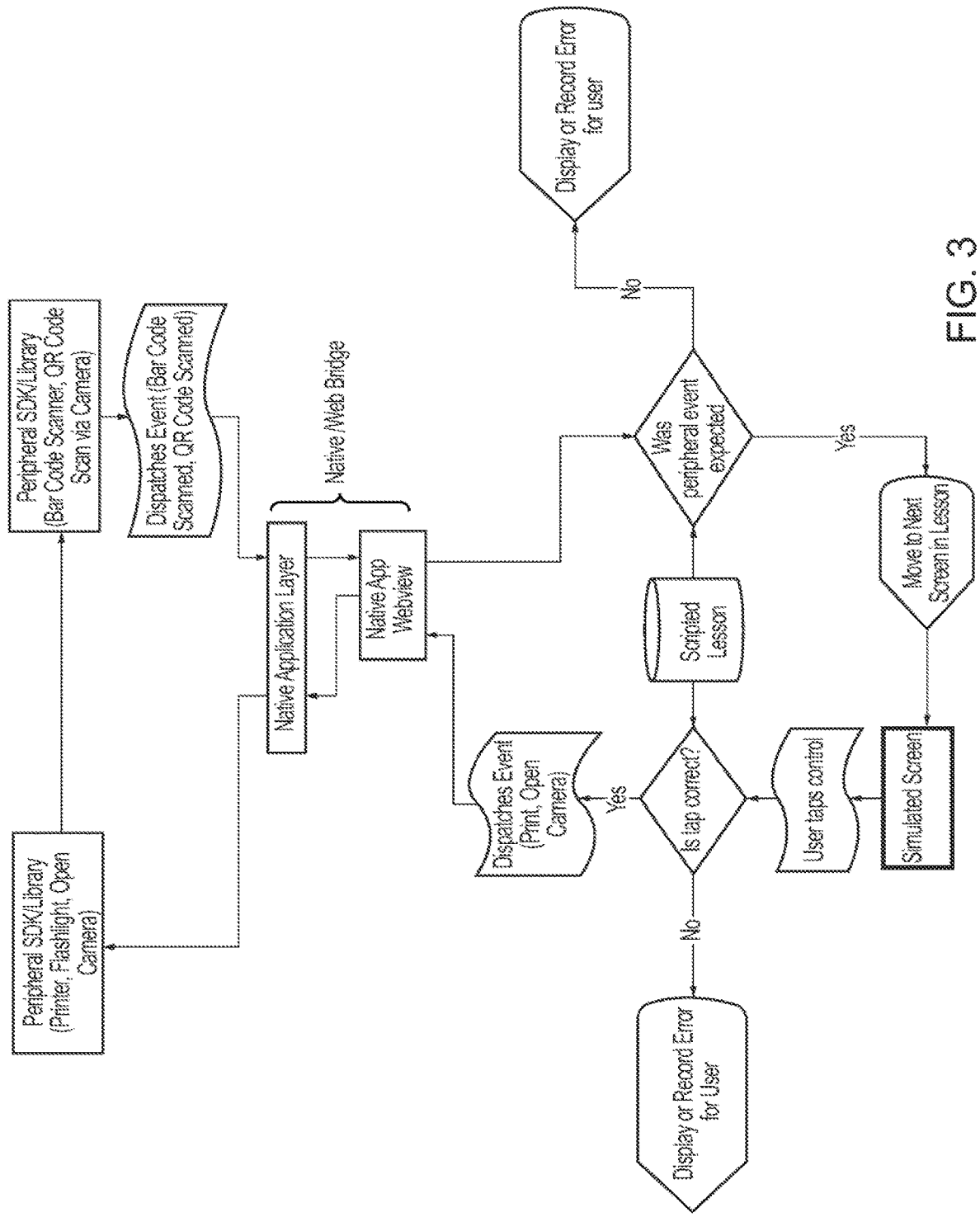
FIG. 3 is a flow diagram for peripheral support.
Figure 4A:
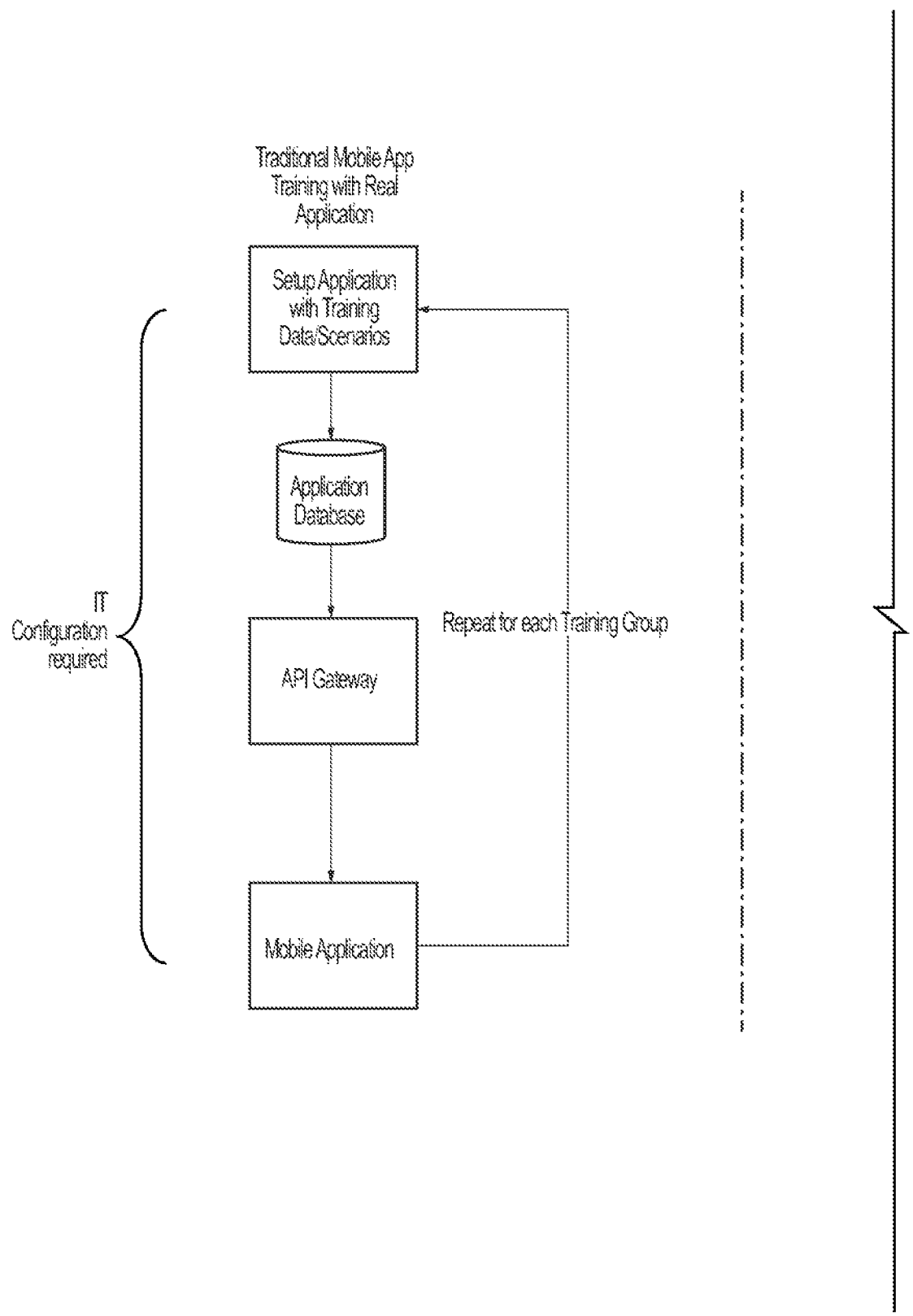
FIGS. 4A and 4B, together, show a flow diagram for sandboxing compared next to a flow diagram for traditional sandboxing.
Figure 4B:
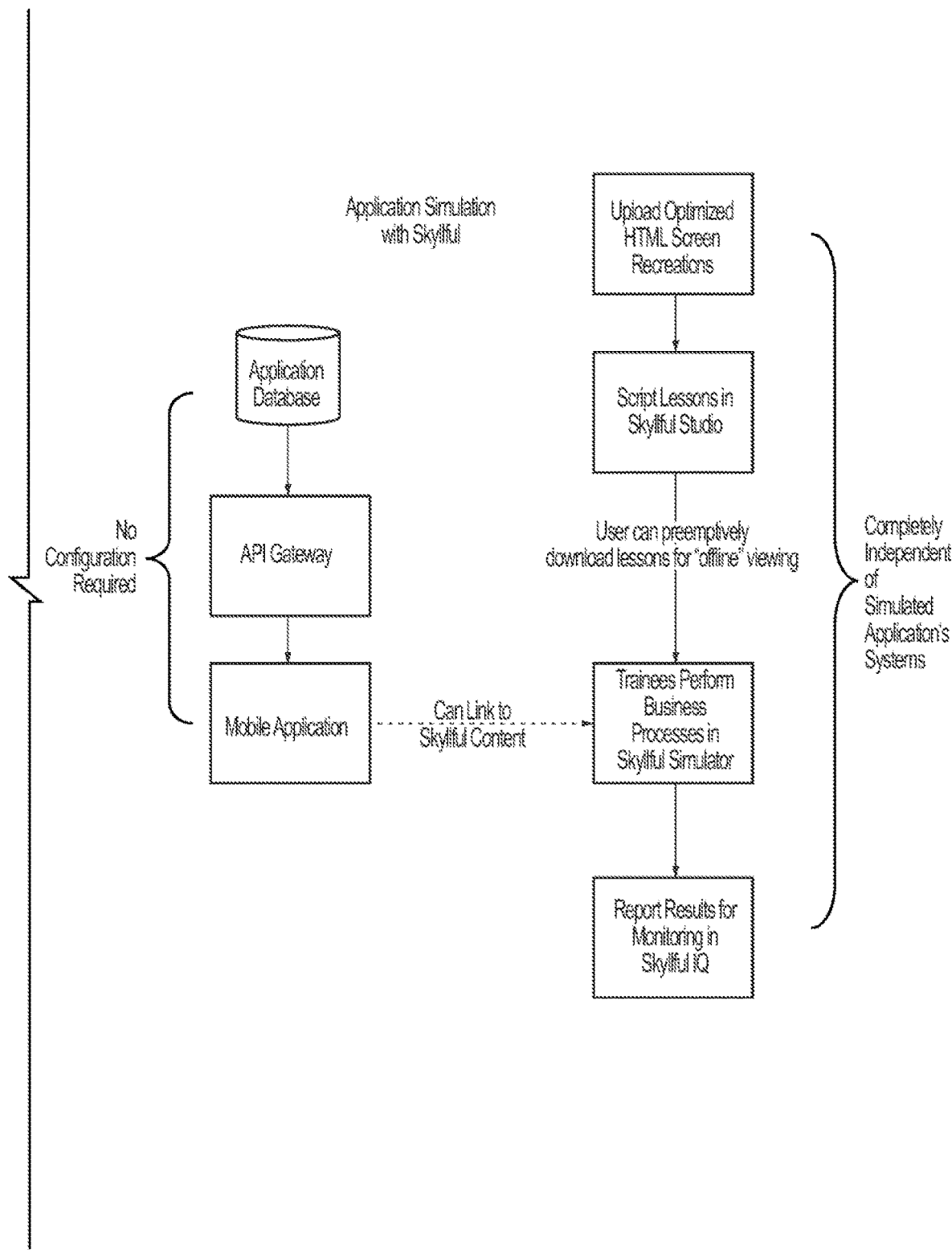
Figure 5:
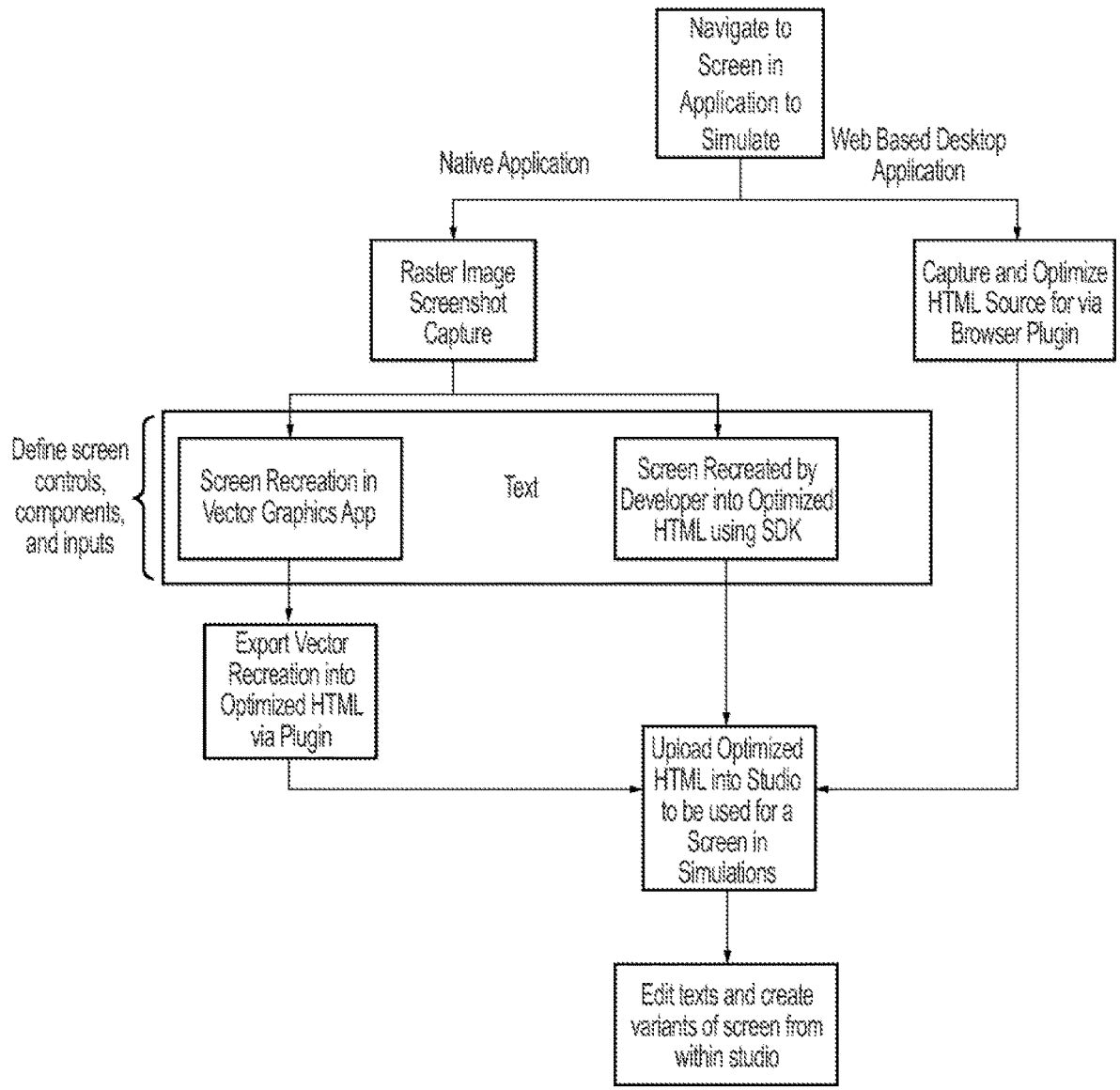
FIG. 5 is a flow diagram for screen capture.
Figure 6:
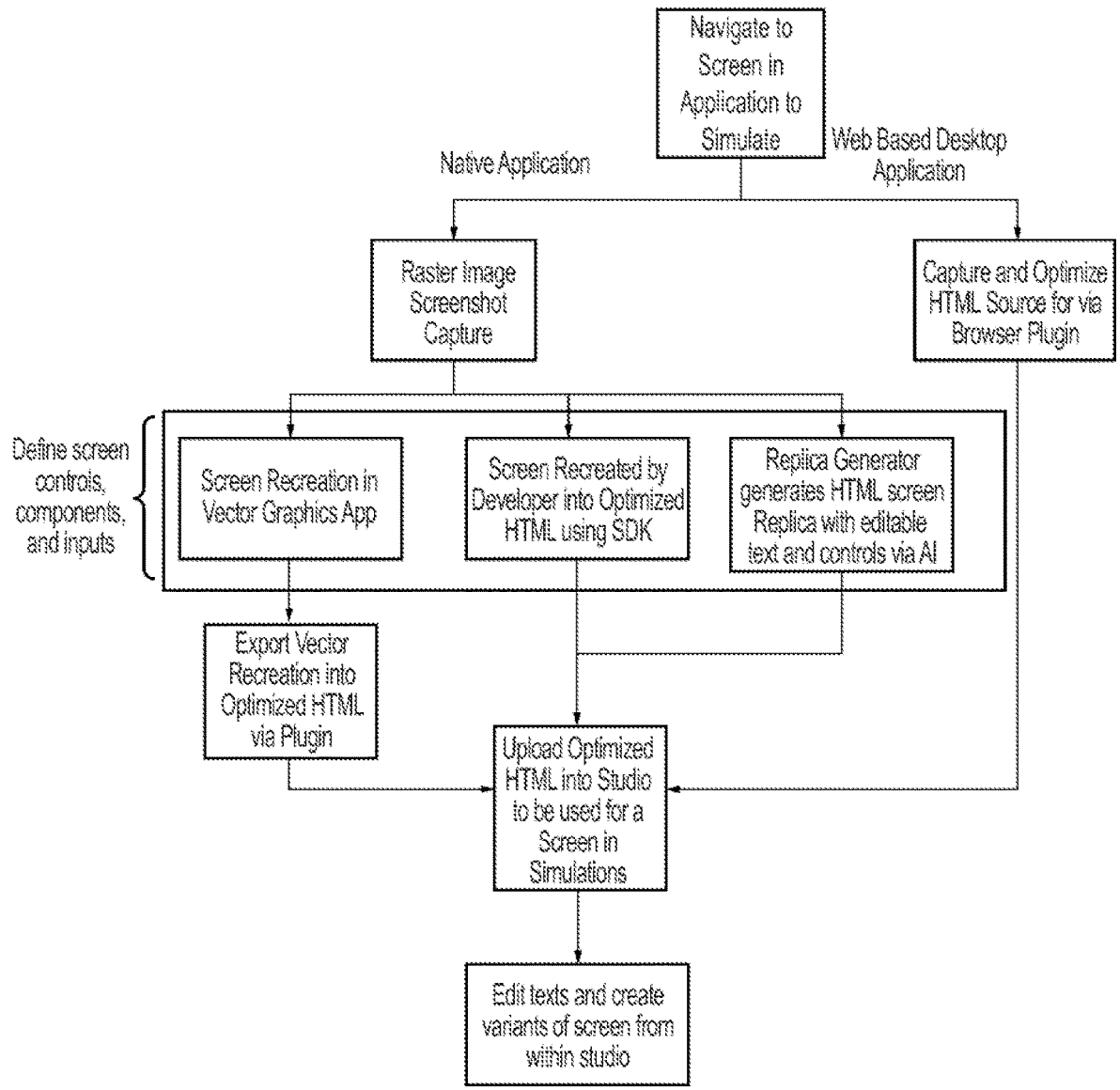
FIG. 6 is a flow diagram for screen replication.

Referring generally to FIGS. 1A and 1B, the present invention facilitates the creation of, the delivery of, and/or the completion of one or more training lessons or the like (each a "Training Lesson" or a "lesson"). In some embodiments, at least part of a Training Lesson includes one or more feature for simulating use of a real-world application (each such Training Lesson being a "Simulation Lesson"). In some embodiments, Simulation Lessons are delivered through a simulation tool, such as a simulation application on a mobile device, to teach users of an application how to properly utilize the application to accomplish various tasks. In some embodiments, lessons comprise a plurality of exercises, challenges, tasks, or the like (each a "Training Exercise"), at least some Training Exercises being configured to train a user in a way that is different from one or more other Training Exercise.

Lesson Descriptors

In some embodiments, one or more Training Lesson is associated with additional information related to the lesson, such as a searchable keyword, an estimated time to complete, a written description (such as a written or audio summary of the objectives and/or content of one or more lesson), and the like (each a "Lesson Descriptor"). In some embodiments, the Lesson Descriptor comprises a plurality of searchable keywords, estimated times, written descriptions, or the like. In some embodiments, searching facilitates discovery and organization of one or more lesson. In some embodiments, the estimated time to complete helps users plan the amount of time needed for completion of one or more lesson. In some embodiments, one or more Lesson Descriptor, such as a description or the like, comprises one or more other Lesson Descriptor, such as a keyword or an estimated time to completion.

Training Programs

In some embodiments, the present invention includes and/or utilizes one or more Training Program comprising one or more Training Tracks, Training Modules, Training Lessons, Training Exercises, or the like. In some embodiments, a Training Module is a collection of Training Lessons. In some embodiments, a particular Training Module is directed towards a particular set of skills for a user to master, such as a module of lessons named "Beginning of Day" that contains lessons on the tasks that need to be completed within an application at the beginning of a worker's day.

In some embodiments, a Training Track comprises a collection of Training Modules. In some embodiments, this collection is related to a set of operations within an initiative, such as fulfilling orders at a retail store (Direct Store Delivery), or operations for a sales rep that visits warehouses of various retailers (Warehouse Sales Rep.)

In some embodiments, the system is configured to identify one or more Training Program associated with a particular user, such as by identifying a particular job role of the user for which mastery of such Training Program(s) is required. In some embodiments, a single user would be required to complete a first Training Program before obtaining certain approvals (such as being approved for a particular job function), access rights, titles (such as a sales rep), or other credentials. In some embodiments, one or more user would be required to complete a second Training Program before obtaining additional credentials, such as management credentials.

In some embodiments, one or more Training Program is associated with an initiative or other corporate (or non-corporate) project, such as a "big bang" rollout of a new application to 3,000 users.

Mastery Checks

In some embodiments, lessons include or are otherwise associated with one or more knowledge check exercises. In some embodiments, such exercise is predominantly a sequential collection of steps that a user should perform in a target application. A step is one or more action a user must make inside an application. In some embodiments, a step is associated with or includes one or more elements. In some embodiments, such elements a step can be associated with include, but are not limited to, the screen the action needs to take place on, the control the user needs to interact with (i.e., a button, or control field), or the like. Alternatively, in some embodiments, a step can be defined as waiting for a device event to have occurred. An example of a device event would be the scanning of a bar code. In yet other embodiments, a step may be the completion of a survey.

In some embodiments, lessons include or are otherwise associated with one or more walkthrough exercises. In such embodiments, walkthrough exercises are similar to knowledge check exercises in that they contain steps with the aforementioned attributes. In some embodiments, a walkthrough exercise is a "guided tour" of a process, such as by having: a step description; audio narration file that is either recorded or generated through Text-to-Speech mechanisms; and/or placement of a description prompt in relation to the highlight user-interface control.

In some embodiments, lessons include or are otherwise associated with one or more video exercise. In such embodiments, a video exercise is associated with one or more video that can be assigned to a lesson to offer an alternative overview/description of one or more lesson.

Readiness Groups

In some embodiments, a managing user, or a group of managing users, manages training campaigns for a group of learners, the managing users and the group of learners each, or collectively, a "Readiness Group". In some embodiments, the Readiness Group monitors the progress of training. In yet other embodiments, the Readiness group partakes in the training. When one or more user is added to a Readiness Group, they can have their direct manager assigned. In such embodiments, the readiness of one or more teams can be assessed. In some embodiments, multiple of the one or more teams is managed by different managers.

In some embodiments, when a user is added to a Readiness Group, they are assigned a Functional Role. In some embodiments, a Functional Role is a mechanism provided to assign multiple Training Tracks to one user. Per previous examples, a Functional Role would be "District Manager" or "Delivery Driver." In some embodiments, one or more campaign is also included. In such embodiments, campaigns represent a set of lessons and their exercises that need to be completed within a certain timespan.

Language

In some embodiments, one or more core tool includes incorporation of one or more language. In some embodiments, editing and creation of multilanguage versions of the lesson content, either within text editors or in a bulk import/export process, is achievable through one or more tool.

Sandboxing

In some embodiments, the present invention replicates one or more feature (such as the appearance and behaviors) of native application screens. In some embodiments, this is an environment which is isolated from the data of the native application, (a "sandboxed environment"). In some embodiments, the sandboxed environment is where users train on simulations of the production application. In such embodiments, the present invention does not require any integrations with the actual production application or associated database, nor does it require copies of production applications or databases. Instead, the present invention involves the creation of replicas of the production application screens. In some embodiments, these screen replicas are used to develop interactive simulations that are visually and functionally indistinguishable from the production application.

In some embodiments, scripted lessons utilize replications of native application screens. In some embodiments, these replications are facilitated by machine and/or browser readable code, such as HTML. In some embodiments, these replications are disconnected from production data and systems. In some embodiments, because of this disconnected setup, a single lesson can be taken by as many users as required by the training, whether undertaken simultaneously or otherwise. Additionally, users can go through a lesson as many times as needed without requiring any reset of training data.

In some embodiments, screen replication allows data and other elements of the screen to be edited. In some embodiments, such editing allowing users to modify fields (such as a product or customer description, date/times, or work order type) without the need to initiate changes within the production application or associated databases.

In some embodiments, screen replication enables simulations to be conducted while a mobile device of a user is not connected to a communication network, such that the device is considered to be in an offline mode. In such embodiments, once one or more lessons are downloaded to the user's mobile device, the device no longer requires wireless internet connectivity to run the simulations.

In some embodiments, the disconnected or unnetworked state creates a unique sandboxed training environment. This environment reduces the potential corruption or misuse of "actual" data (e.g. company, customer or product) encountered by training in a "live" production environment and/or 2) the need for IT support to create and maintain copies of production application environments to facilitate training.

Peripheral Support

In some embodiments, one or more peripheral of a mobile device is utilized. In some embodiments, such peripheral is a bar code scanner, camera view finder, BLUETOOTH, or other peripheral for mobile device.

In some embodiments, to facilitate use of such peripherals in conjunction with a sandboxed application, the invention includes one or more layer. A layer is an organization structure for a data reference hierarchy, where one layer may interact with a relatively adjacent layer in the data reference hierarchy. In some embodiments, such one or more layer is a native application layer, while in other embodiments it is an embedded layer, such as an embedded WebView layer, while in yet other embodiments multiple layers of varying types are utilized.

In some embodiments, where the layer is a native application layer, the native application layer represents one or more functionality. In some embodiments, this functionality is 1st Party Native Functionality. In such embodiments, this functionality consists of SDKs and user interface libraries that one or more organization provide to developers. This layer interacts directly with the device sensors that have been exposed by the one or more organization. The one or more organization is typically the provider or manufacturer of the mobile device or its peripherals. In some embodiments, this layer can use 3rd Party vendor libraries to interact with bar code scanners, printers, and Bluetooth peripherals, or other peripherals of the mobile device.

In some embodiments, where the layer is an embedded WebView layer, the layer represents a simple version of the device's web browser. In some embodiments, the web browser is embedded into an application. The system uses this browser to display the screens of the simulated application.

In some embodiments, where more than one layer type is utilized, the Native Application Layer monitors for events dispatched from the user's interactions with the screen at the WebView Layer. In some embodiments, one or more events can trigger various device functions, including but not limited to sending a print job and opening the camera view finder.

In some embodiments, the Native Application Layer also sends one or more event to the Embedded Layer when a device function has executed. In some embodiments, the system provides status. In some embodiments, the system will also communicate the result to a user, such as a bar code value, whether the print job was successful, or the like. In some embodiments, these events can be dispatched and caught through one or more communication layer, such as a JavaScript bridge, or through another proxy, such as web sockets.

Screen Replication

In some embodiments, the system produces screen replicas. In some embodiments, such screen replication leverages web technologies to create highly optimized replicas, such as HTML replicas of application screens. In some embodiments, these screen replicas are used to create lesson simulations in one or more tool. The lesson simulations are delivered to a simulator, where learners can use the lessons to train on their applications.

In some embodiments, the replicas can be created with one or more approach. In a first approach, the system utilizes a graphics application plugin. In some embodiments, a user takes a static screenshot of application screens and recreate those screens using an image interpretation method, such as vector graphics interpretation. In some embodiments, the system catalogs the hierarchy of shapes and text present in those screens and then passes it on to a server-side system. The server-side system then converts the catalog into a series of computer readable elements, such as HTML, CSS, and SVG elements. In embodiments where CSS elements are utilized, such elements are embedded in the resultant HTML file to remove the rendering dependencies of external files.

In some embodiments, while recreating the screen in the graphics application, a designer can annotate what elements need to become buttons and text areas. In such embodiments, the screens are no longer "static" recreations, but can be used to create interactive simulations via the annotations. The system receives the annotations as inputs and outputs the resulting annotated elements as dynamic elements. Such dynamic elements are then configured to be interacted with by a user, such as a trainee.

In some embodiments, the system utilizes a developer application that a user can utilize to build screens from the ground up, such as JavaScript React SDK. In some embodiments, the developer application in conjunction with a secondary interface, such as React, enables developers to create reusable components that they can plug into various screens. In some embodiments, the SDK configures a packager, such as WebPack, to inline any CSS styles, SVG graphics, and JS to make single screen files that can be uploaded into a core element tool.

In a third approach, the system utilizes a browser plugin. In such embodiments, replicating browser-based applications is enabled. In some embodiments, the user creates a "photo copy" of the page they are currently viewing. Such photo copy includes the visual elements of the page the user is currently viewing. In some embodiments, the photo copy scrolls along an active page, allowing for the capture of the entirety of the page, not just that in the user's initial view. In embodiments with such photo copy, the system in-lines all CSS and JS, or the like, to facilitate the uploading of a single file into a core element tool of the system.

In some embodiments, the system includes screen replica editing. In some embodiments, such editing utilizes one or more tool of the system. In some embodiments, after a screen replica has be uploaded into a core element tool of the system, a user can edit the text of the screens. In some embodiments, the system creates variations of screens to better match different contexts, such as by showing an orders screens with the names of grocery stores for a particular geographic area. In some embodiments, the geographic area, or other information pertinent to the current user, can be ascertained through user input, accessing peripherals, pre-populated information, or the like.

In some embodiments, the system utilizes a Replica Generator. In such embodiments, the Replica Generator is an artificial intelligence powered editor that leverages machine learning to recognize device controls and screen elements such as buttons, icon buttons, radio buttons, etc. In some embodiments, a screenshot, or series of screenshots, is uploaded into the Replica Generator. In some embodiments, the Replica Generator utilizes Occular Character Recognition ("OCR") to identify text, font-size, font-color, and limitations within the uploaded screenshot or series of screenshots. In some embodiments, at least some of the original text contained in the screenshot or series of screenshots is removed from its bitmap. In some embodiments, text data extracted from the OCR is added to the screenshot, or series of screenshots, such as by adding floating HTML, elements. In some such embodiments, adding text data allows training content developers the ability to edit text fields as needed within the screen replicas. In some embodiments, the artificial intelligence within the Replica Generator defines the bounds of the visual representation of screen elements and controls and the like (each an "Application Feature"). In some embodiments, at least part of the visual representation of at least some Application Features are removed from bitmaps of respective screenshots, thereby removing the Application Features from such screenshots. In some embodiments, removed Application Features are replaced with dynamic elements, such as floating HTML elements. In some embodiments, dynamic elements are associated with functionality of the application and/or are configured to mimic such functionality during a training session. In some embodiments, the Replica Generator finds bitmap data in the original screenshot that can be "tiled" to reduce the overall file size of the screen replica. In some embodiments, the artificial intelligence within the Replica Generator can be enhanced with previous screen replicas created using a vector graphics editor and screen elements and controls identified by content developers 910.

In some embodiments, the system of the present invention includes means of facilitating screen capture, such as by way of using a Screen Uploader Application. In some embodiments, the Screen Uploader Application is native to a system device, such as a mobile (or other) device that is similar to a user device (or is capable of generating images that are similar to images displayed by a user device) for which the training is required. In some embodiments, an application for which training is required is loaded onto and executable from the system device, thereby facilitating capture of various images of the application. In some embodiments, the Screen Uploader Application allows a user to capture, or records, a series of screens within the application workflow.

In some embodiments, the Screen Uploader Application includes a starting mechanism for initiating a screen capture session for capturing screenshots for an application workflow, such as by generating a timestamp associated with the start of such session. During the screen capture session, a production (or other) application can be executed on the same device such that the device simultaneously runs a screen capture session of the Screen Uploader Application with an application session. In some embodiments, the device's operating system is used to take screenshots of the application during the application session. In some embodiments, the Screen Uploader Application includes an ending mechanism for ending the screen capture session, such as by generating a timestamp associated with the end of such session. In some embodiments, screens captured from the beginning and end of the screen capture session are organized by the Screen Uploader Application and uploaded to the system of the present invention. In some embodiments, the system is configured to generate a plurality of screen replicas from the plurality of screenshots. In some embodiments, two or more screenshots are stitched together to form a single screen replica.

In some embodiments, the system is configured to annotate or otherwise identify areas of interest within a screenshot. In some embodiments, a user can interact with the system device, such as by tapping on screenshots, to annotate where virtual inputs, such as buttons, are located. In some embodiments, creation of an annotation requires a long hold or other deliberate action of a user.

Referring to FIGS. 1A and 1B, some embodiments of the present invention include the steps of creating a training program entity 101, creating a training track entity 102, creating a training module entity 103, and creating lessons 104, such as simulation lessons and the like. In some embodiments, the present invention further includes creating a readiness group 301 and assigning users 401 to the readiness group. In some such embodiments, the process further includes creating a campaign 302, such as by identifying a start and end date for such campaign. Lessons are then assigned to the campaign 303.

Still referring to FIGS. 1A and 1B, some embodiments of the present invention further include the steps of specifying estimated time to complete a lesson 201, specifying an overview of the lesson 202, providing a preview of a lesson 203, and uploading video 204. In some embodiments, each lesson includes a plurality of steps. In some such embodiments, creation of each step 105 includes attaching files, such as audio narration for step or text-to-speech generation 601, specifying expected user action 602, such as a tap, text entry, peripheral action, or the like, specifying prompt text for walkthrough, practice, assessment 603, specifying prompt text placement 604, and specifying a screen to use for the step 605.

In some embodiments, generating the specified screen includes uploading optimized screens 501, such as optimized HTML screens. In some embodiments, the optimized screens 501 are updated, such as by editing screen text 502 and copying screens 503, either manually or by way of a screen generation application. In some embodiments, the present invention further includes the steps of specifying supported languages 701, viewing and editing a program in specific language 702, and exporting and importing program content for bulk translation 703 of the lesson content.

Figure 7:
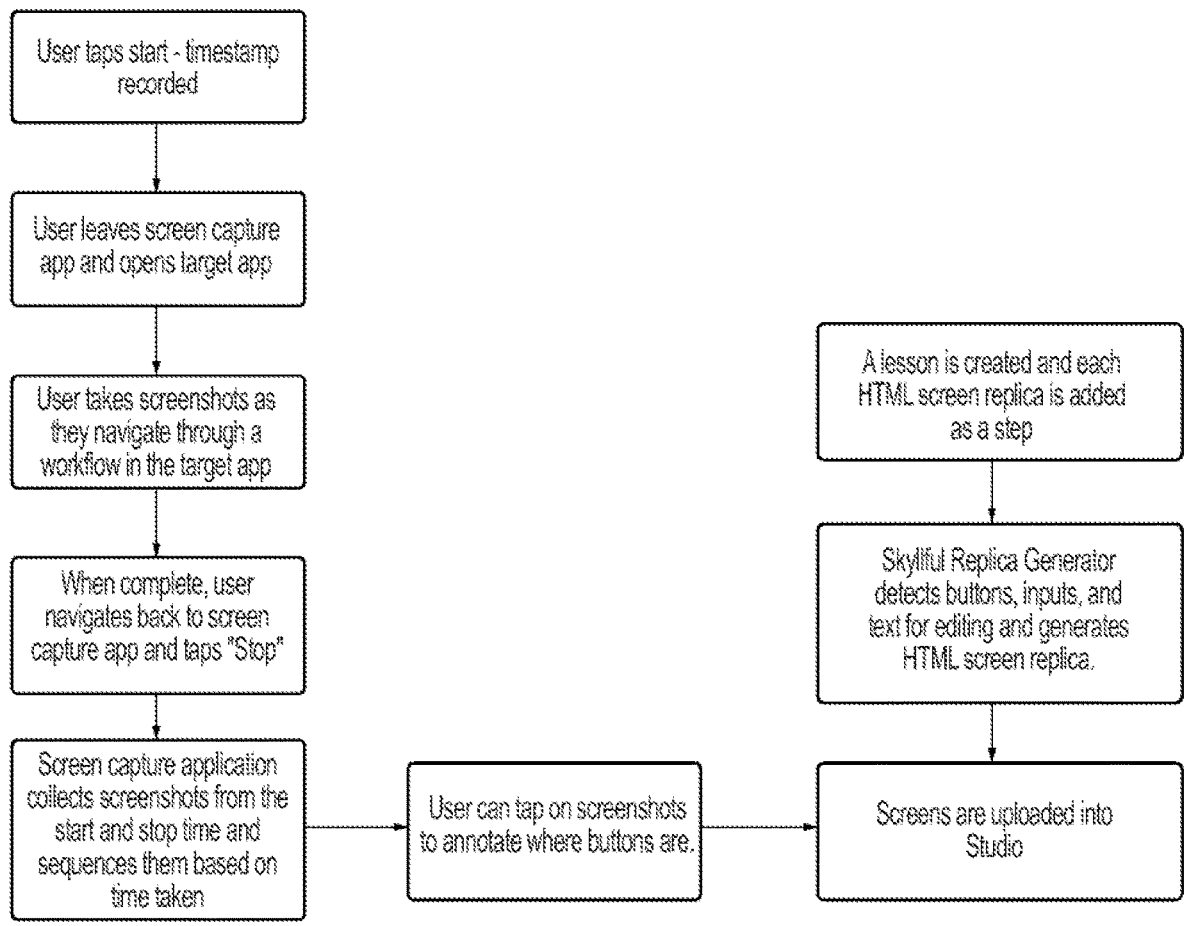
FIG. 7 is a flow diagram showing a screen upload process associated with a Screen Uploader Application of certain embodiments of the present invention.
Figure 8:
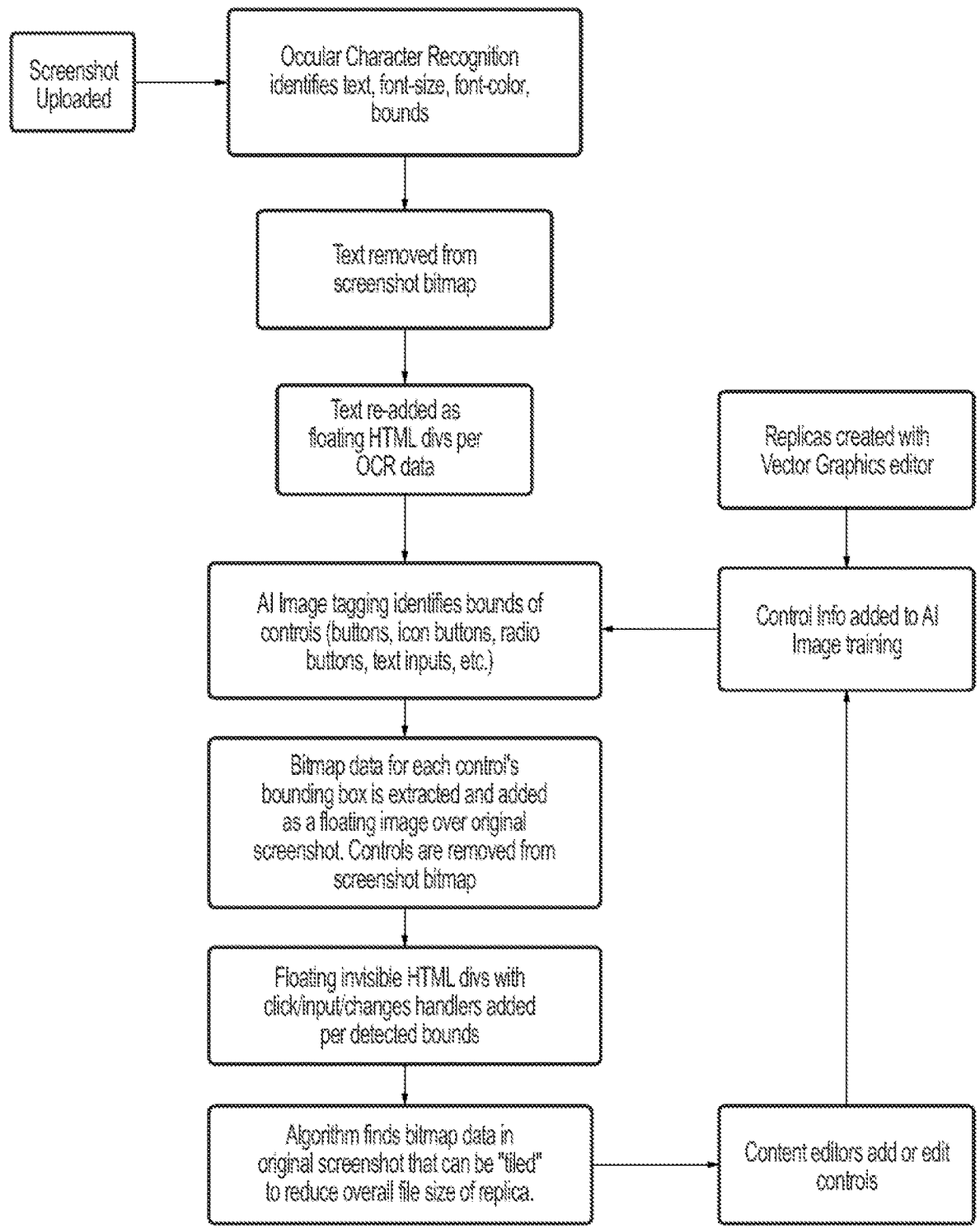
FIG. 8 is a flow diagram showing a replica generation process associated with a Replication Generator of certain embodiments of the present invention.
Figure 9A:
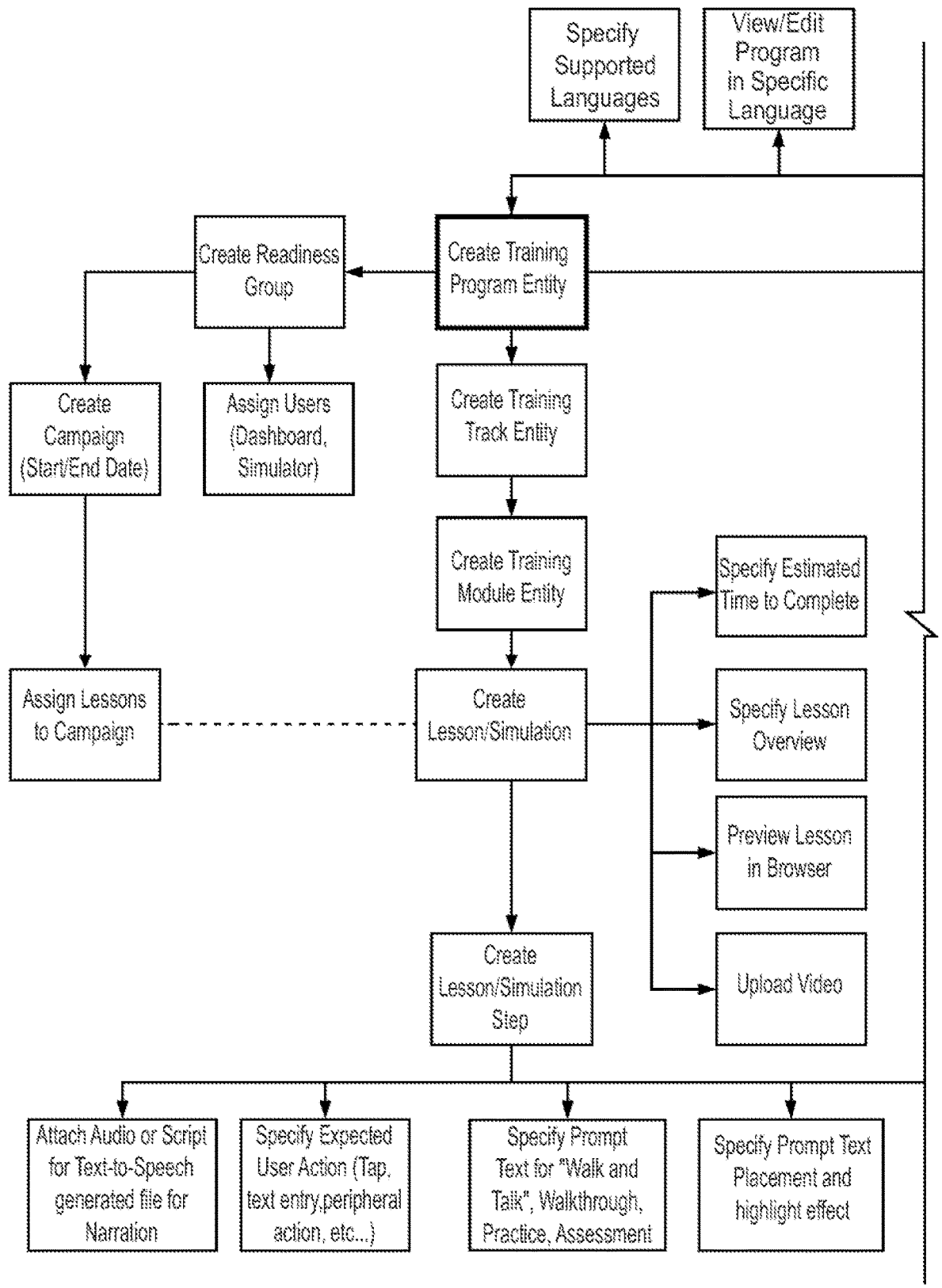
FIGS. 9A and 9B, together, show a flow diagram for lesson creation, according to one embodiment of the present invention.
Figure 9B:
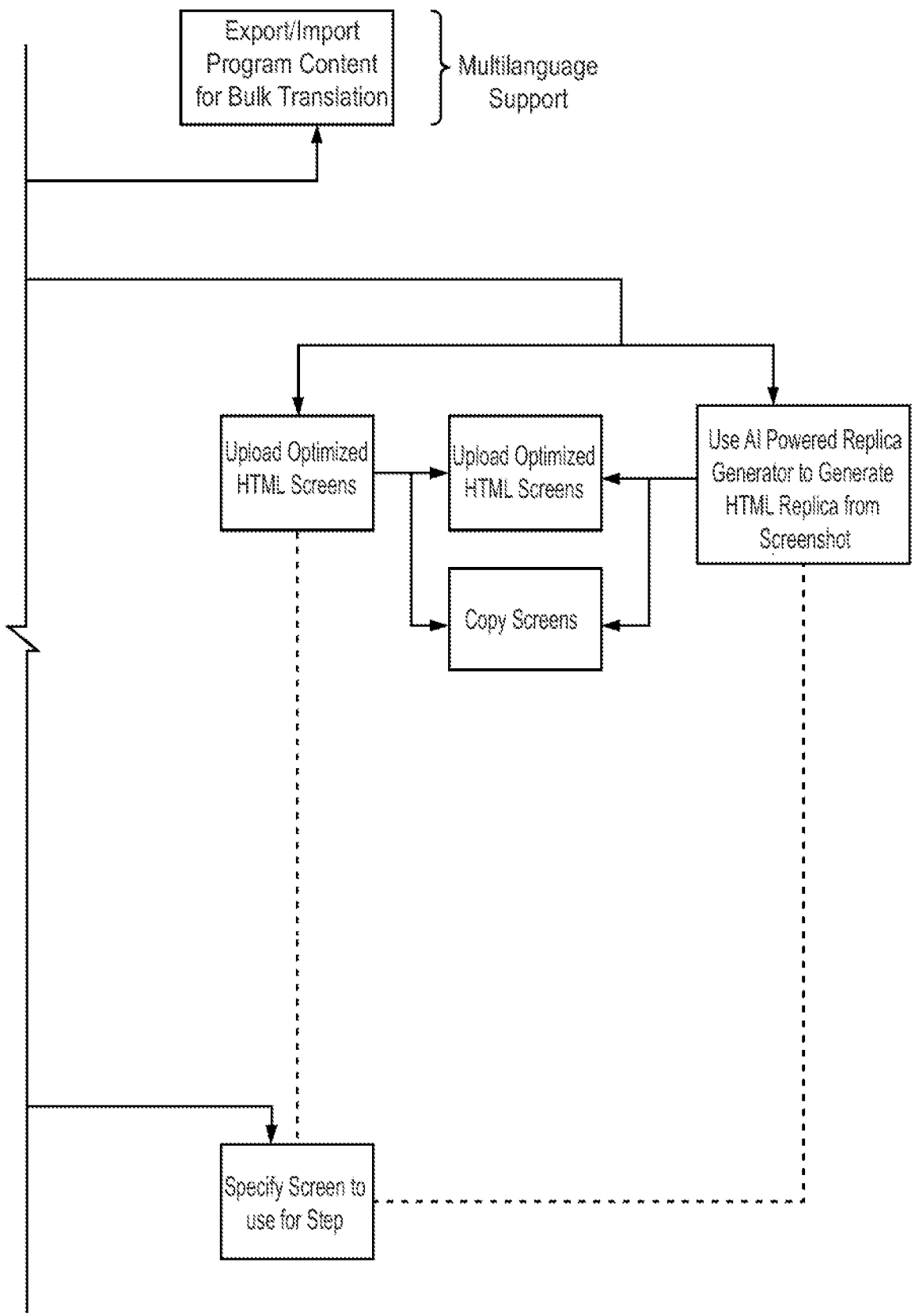

Referring to FIG. 7, in some embodiments, the present invention includes a screen uploader application process. In some embodiments, the screen uploader application process includes initiating a screen capture session 1001, such as by a user tapping start and a timestamp being recorded. In some embodiments, process further includes the user leaving the screen capture application and opening a target application 1002. In some embodiments, the process further includes the user taking screenshots as they navigate through a workflow in the target application 1003. Upon completion of capturing screenshots, the user terminates the screen capture session 1004, such as by navigating back to the Screen Capture Application and selecting a "Stop" feature. In some embodiments, the Screen Capture Application collects screenshots taken during the screen capture session and organizes them based on the time each screenshot was taken 1005. In some embodiments, the user can annotate 1009 one or more of the screenshots, such as by tapping or otherwise engaging with screenshots to be annotated. In some such embodiments, tapping identifies a location of a button or other application feature represented by the screenshot. In some embodiments, screens are uploaded into a replica tool 1006, the replica tool being configured to utilize the screenshots to create screen replicas. In some embodiments, the replica tool detects visual representations of various features of the target application, such as buttons, input fields, and text for editing 1007. In some embodiments, screen replicas are generated based on detected features. In some embodiments the process further includes creating a lesson 1008, such as by grouping a plurality of screen replicas together and organizing such screen replicas into steps of the training.

In some embodiments, grouped screenshots are uploaded from the Screen Uploader Application to a platform, such as a system for facilitating on-device training and creating, updating, and disseminating micro-learning simulations. In some embodiments, the Replica Generator automatically detects application controls and generates HTML screen replicas.

Image Reference

In some embodiments, Training Tracks, Training Lessons, Training Modes, and Training Exercises are associated with an image reference, such as a thumbnail image. In some embodiments, if no image reference is selected the system will include a generic placeholder image. In some embodiments, the image reference provides the user a preview of the training lesson they are about to take. In some embodiments, the reference image is a .jpeg or .jpg format. In some embodiments, the reference image contains minimal text and contrasting color.

In some embodiments, every piece of text in a screen becomes a variable. In some embodiments, a user can then change the value of the variables as needed without having to go back to the graphics application, plugin, or other developer application, such as React SDK.

In yet further embodiments, incorporating further interfaces designs is contemplated. In some embodiments, varied configurations of mobile application are included. In some embodiments, integrating analytics to correlate simulation training to feature engagement allows for dynamic implementation of one or more core element tools. In some embodiments, delivery of other training content besides micro-learning simulations and videos is provided, such as videos, audio, and peripheral interfaces for achieving other tasks. And in yet some embodiments, in-app linking to specific training simulations or guidance is provided.

In some embodiments the present invention is a system for creating a training lesson for using an application, such as on a mobile device. In some embodiments, the system includes a screen uploader loaded onto a system device, the screen uploader being configured to capture and organize a plurality of screenshots from the system device during a screen capture session. In this way, the system device can be utilized to capture images for creation of the training lesson. In some embodiments, the system includes a replica tool in data communication with the screen uploader, the replica tool being configured to utilize the plurality of screenshots to create screen replicas having dynamic elements. In some embodiments, the system further includes an annotation mechanism that is configured to create annotations for annotating the plurality of screenshots, thereby facilitating creation of the dynamic elements of the screen replicas, each dynamic element being configured to be interacted with by a trainee during the training lesson. In some embodiments, the application includes application features, each application feature being configured to be interacted with by the trainee during use of the application. In some such embodiments, each dynamic element is configured to mimic, from the trainee's perspective, functionality of a corresponding application feature.

In some embodiments, the replica generator is configured to analyze the screenshots to identify each application feature associated with each screenshot, thereby facilitating creation of the dynamic elements. In some embodiments, the replica generator utilizes the annotations to identify at least some of the application features.

In some embodiments, the screen uploader includes a starting mechanism, a capture mechanism, and an ending mechanism. In some such embodiments, the starting mechanism is configured to generate a first time stamp upon activation of the starting mechanism, the first time stamp being associated with a start time for the screen capture session. In some embodiments, the ending mechanism is configured to generate a second time stamp upon activation of the ending mechanism, the second time stamp being associated with an end time for screen capture session. In some embodiments, the screen uploader is configured to facilitate use of the application on the system device during the screen capture session, such as by allowing the screen uploader application to close or be minimized during the screen capture session. In some embodiments, the screen uploader is configured to identify screenshots taken during the screen capture session based on the time each screenshot was captured, such as by comparing timestamps for each screenshot with timestamps associated with the start and end of the session.

In some embodiments, the system includes an annotation mechanism having an interface mechanism, the interface mechanism being configured to receive input from a user of the system device, thereby facilitating creation of the annotations. In some embodiments, the interface requires utilization of one or more feature of the system device, such as buttons, touchscreens, or the like. In some embodiments the interface mechanism includes a location identification mechanism, such as a location identification mechanism that is configured to identify a location identified by the user. In this way, a user can identify a location on the screenshot for placing the annotation. In some such embodiments, the location identification mechanism is in data communication with a touch screen of the system device and the location identification mechanism is configured to identify when the user touches a location of the screenshot for longer than a preset period of time, such as when holding over the relevant area. In some embodiments the replica tool is configured to identify at least some characteristics of the application features, such as outlines of buttons, input features, and the like. In some embodiments, the replica tool is configured to create proposed characteristics for associated dynamic elements, thereby assisting with the creation of the screen replica prior to such characteristics being finalized upon completion of the screen replica. In some such embodiments, the replica tool is configured to compare proposed characteristics of dynamic elements with finalized characteristics of dynamic elements, thereby determining the difference between proposed characteristics and desired characteristics. In some such embodiments, the replica tool is configured to analyze such comparison to improve future functionality of the replica tool.

In some embodiments, the replica tool is configured to remove information from a bitmap, such as a screenshot bitmap. In some embodiments, the removed information is text, visual representations of application features, or the like. In some embodiments, the replica tool is configured to add editable text to the screen replica, such as to replace removed text.

Some embodiments of the present invention include a method of creating a training lessons for use of an application, such as on a mobile device. In some embodiments, the method includes capturing images of a first display screen of the application, using the images to create screen replicas, and configuring the screen replicas to include mock functionality that, from a trainee's perspective during a training lesson, functions similar to actual functionality of the application, such as by including a first dynamic element in the screen replicas to facilitate the mock functionality. In some embodiments, the method further includes annotating the images to create annotations. In some such embodiments, updating the lessons is achieved by updating the annotations.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A system for creating a training lesson for using an application on a mobile device, the system comprising:
   a screen uploader loaded onto a system device, the screen uploader being configured to capture and organize a plurality of screenshots from the system device during a screen capture session;
   a replica tool in data communication with the screen uploader, the replica tool being configured to utilize the plurality of screenshots to create screen replicas having dynamic elements; and
   an annotation mechanism that is configured to create annotations for annotating the plurality of screenshots, thereby facilitating creation of the dynamic elements of the screen replicas, each dynamic element being configured to be interacted with by a trainee during the training lesson,
   wherein the application includes application features, each application feature being configured to be interacted with by the trainee during use of the application, and
   wherein each dynamic element is configured to mimic, from the trainee's perspective, functionality of a corresponding application feature,
   wherein the replica tool utilizes a graphics application plugin, wherein the graphics application plugin is configured to catalog a first set of elements, and wherein the graphics application plugin converts the first set of elements into computer readable elements, thereby facilitating creating the screen replicas.

2. The system of claim 1, further comprising a replica generator that is configured to analyze the screenshots to identify each application feature associated with each screenshot, thereby facilitating creation of the dynamic elements of the screen replicas, wherein each screen replica is an editable representation of a corresponding screenshot, the accuracy of the representation being adjustable by changing one or more characteristics of the screen replica, thereby facilitating updates to the visual appearance of the screen replica without requiring the procurement of a new screenshot, wherein the updates to the visual appearance includes editing text of the screen replica.

3. The system of claim 1, further comprising a replica generator that is configured to analyze the screenshots to identify each application feature associated with each screenshot, thereby facilitating creation of the dynamic elements, wherein the replica generator utilizes the annotations of the screenshot to identify at least some of the application features.

4. The system of claim 3, wherein the screen uploader comprises a starting mechanism, a capture mechanism, and an ending mechanism,
   wherein the starting mechanism is configured to generate a first time stamp upon activation of the starting mechanism, the first time stamp being associated with a start time for the screen capture session,
   wherein the ending mechanism is configured to generate a second time stamp upon activation of the ending mechanism, the second time stamp being associated with an end time for screen capture session,
   wherein the screen uploader is configured to facilitate use of the application on the system device during the screen capture session, and
   wherein the screen uploader is configured to identify screenshots taken during the screen capture session based on the time each screenshot was captured.

5. The system of claim 4, wherein the annotation mechanism includes an interface mechanism, the interface mechanism being configured to receive input from a user of the system device, thereby facilitating creation of the annotations.

6. The system of claim 5, wherein the interface mechanism includes a location identification mechanism, the location identification mechanism being configured to identify a location identified by the user, thereby identifying a location on the screenshot for placing the annotation.

7. The system of claim 6, wherein the location identification mechanism is in data communication with a touch screen of the system device and wherein the location identification mechanism is configured to identify when the user touches a location of the screenshot for longer than a preset period of time.

8. The system of claim 7, wherein the replica tool is configured to identify at least some characteristics of the application features, the replica tool being further configured to create proposed characteristics for associated dynamic elements.

9. The system of claim 8, wherein the replica tool is configured to compare proposed characteristics of dynamic elements with finalized characteristics of dynamic elements, and wherein the replica tool is configured to analyze such comparison to improve future functionality of the replica tool.

10. The system of claim 9, wherein the replica tool is configured to remove information from the screenshot bitmap, the removed information being text and visual representations of application features, wherein the replica tool is further configured to add editable text to the screen replica, the editable text replacing the removed text.

11. A system for creating a training lesson for using an application on a mobile device, the system comprising:
    a screen uploader loaded onto a system device, the screen uploader being configured to capture and organize a plurality of screenshots from the system device during a screen capture session;
    a replica tool in data communication with the screen uploader, the replica tool being configured to utilize the plurality of screenshots to create screen replicas having dynamic elements; and
    an annotation mechanism that is configured to create annotations for annotating the plurality of screenshots, thereby-facilitating creation of the dynamic elements of the screen replicas, each dynamic element being configured to be interacted with by a trainee during the training lesson,
    wherein the application includes application features, each application feature being configured to be interacted with by the trainee during use of the application, and wherein each dynamic element is configured to mimic from the trainee's perspective, functionality of a corresponding application feature, wherein the system further comprises a replica generator that is configured to analyze the screenshots to identify each application feature associated with each screenshot, thereby facilitating creation of the dynamic elements of the screen replicas, wherein each screen replica is an editable representation of a corresponding screenshot, the accuracy of the representation being adjustable by changing one or more characteristics of the screen replica, thereby facilitating updates to the visual appearance of the screen replica without requiring the procurement of a new screenshot, wherein the updates to the visual appearance includes editing text of the screen replica, and wherein the replica generator utilizes Ocular Character Recognition to extract a first set of data from the plurality of screenshots, wherein the first set of data is converted into a first set of floating HTML elements, wherein the first set of floating HTML elements are added to the screen replicas, thereby facilitating creating the screen replicas, and wherein the updates to the visual appearance includes editing visible non-text characteristics of at least one dynamic element of the screen replica.

* * * * *